United States Patent [19]

Thériault

[11] Patent Number: 4,841,619
[45] Date of Patent: Jun. 27, 1989

[54] DEWIRING TOOL

[76] Inventor: Mario Thériault, 55 Madawaska St., St-Jacques, New Brunswick, Canada, E0L 1K0

[21] Appl. No.: 122,212

[22] Filed: Nov. 18, 1987

[51] Int. Cl.$^4$ .................. B23P 19/00; B23P 19/02; B31B 1/25
[52] U.S. Cl. .................. 29/426.3; 29/426.4; 83/909
[58] Field of Search .............. 83/909; 29/426.3, 426.4

[56] References Cited

U.S. PATENT DOCUMENTS

| | | | |
|---|---|---|---|
| 3,152,621 | 10/1964 | Meier | 83/909 |
| 4,250,783 | 2/1981 | Ogle | 83/909 X |
| 4,306,350 | 12/1981 | Kielma et al. | 29/426.3 X |
| 4,348,801 | 9/1982 | Dumont et al. | 83/909 X |
| 4,575,918 | 3/1986 | Mattson | 29/426.3 X |

*Primary Examiner*—William L. Sikes
*Assistant Examiner*—Akm E. Ullah

[57] ABSTRACT

A tool to dewire a bale of dry pulp, waste paper or the like. The tool grabs the wire, cuts it and retains the cut wire. The same sequence of operation is repeated for other wires. The tool then coils the cut wires and discharges the coils as waste. The tool comprises a support casing in which is rotatably mounted a vertical cylindrical tube. This tube includes at its bottom end a pair of opposite slots having a lower portion spiralling for about a quarter of a turn, and an upper portion which extends longitudinally of the tube. A grabber arm, operated by a hydraulic cylinders, is mounted within the tube for up-and-down movement. Wire bending elements and a cutter blade are also mounted within the tube. In operation the tool tube is positioned over a selected wire and applied on the bale. The tube is rotated about one-quarter of a turn to pick up the wire in its spiral slots and raise the wire off the bale. The grabber arm then hooks the wire and pulls the same up. The wire is bent, is cut and its bent end is retained in the tube. Several wires can be cut and retained in the same manner. The tube is then rotated several turns, to be used as a mandrel in association with a coil-forming shoe, so as to wind the wires into compact coil. Then the shoe extracts the coil from the tube for discharge into a bin.

14 Claims, 10 Drawing Sheets

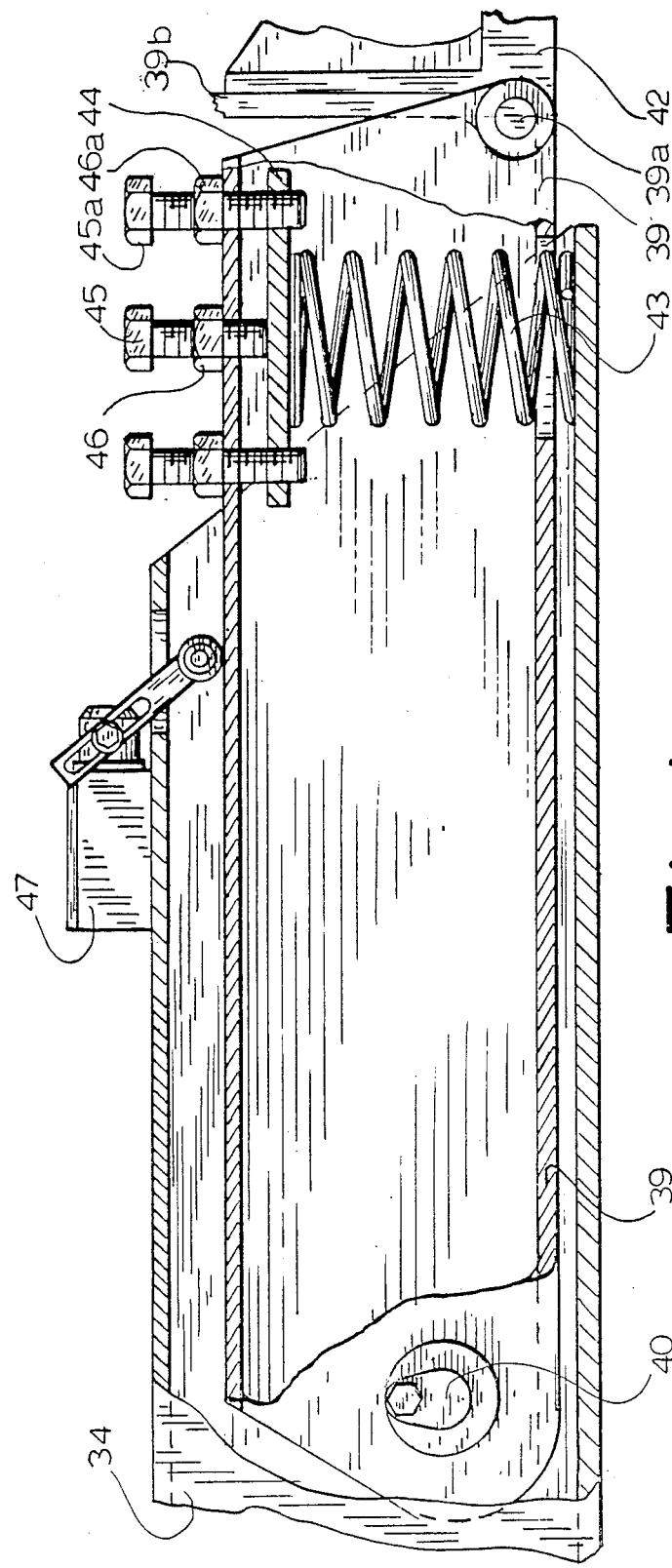

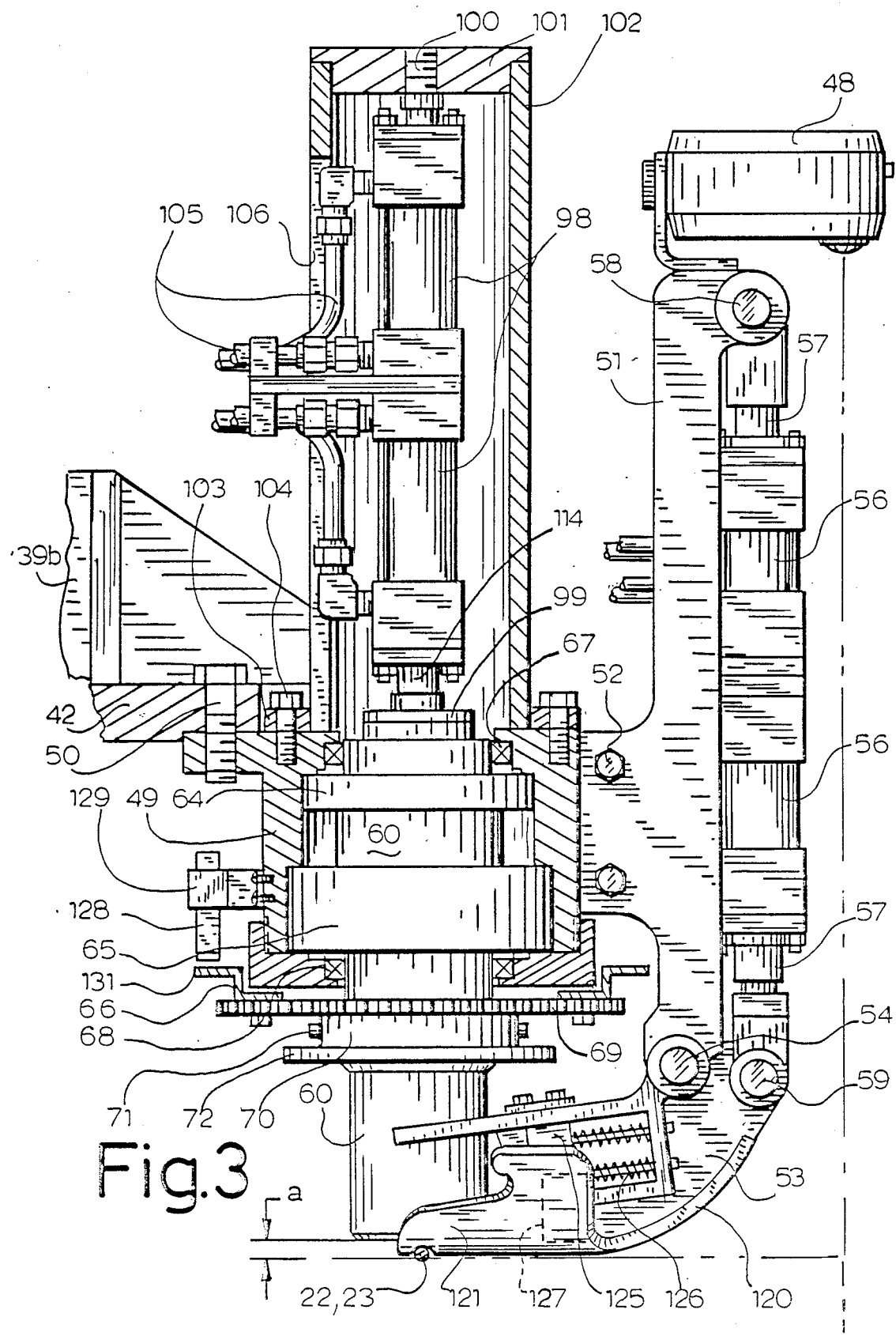

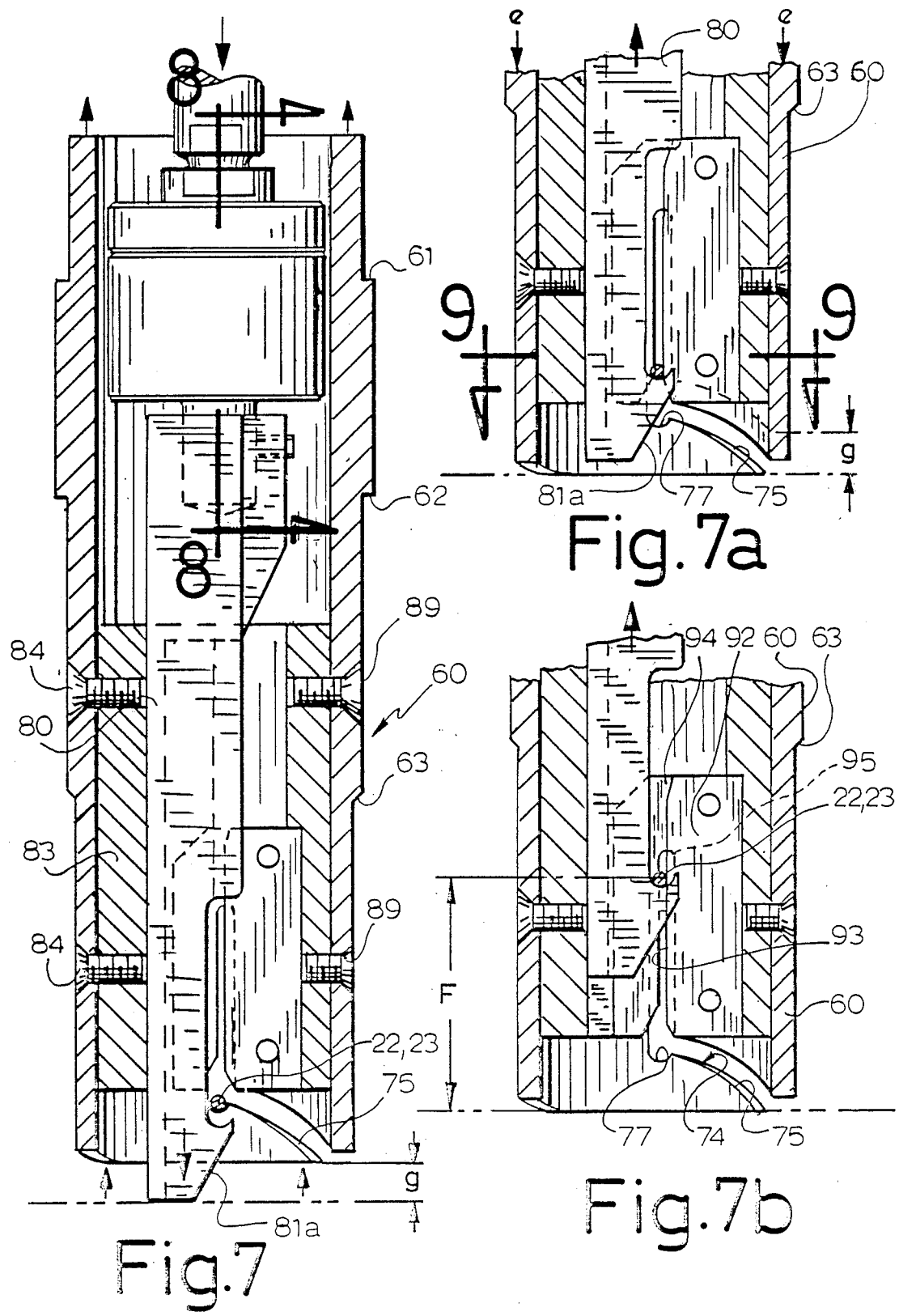

DEWIRING TOOL

FIELD OF THE INVENTION

This invention relates to a tool for dewiring bales of dry pulp, waste paper, fabric and the like.

BACKGROUND OF THE INVENTION

In paper mill repulpers, the feed stock often consists, mostly, of dry pulp supplied as bales tied with strapping, such as metallic wires to form blocks of about three hundred pounds each. For unbaling, these metallic wires are usually manually cut by pliers. Since the lower section of each cut wires remains stuck under the heavy bale, the worker cannot remove the cut wire immediately. These wires may find their way eventually into slots or cavities of nearby machinery and damage the same. Also, since these wires are generally tied taut around the bale, they tend to whip when released by the cutting pliers. This constitutes a safety hazard for the worker.

A bale dewiring tool is described in applicant's U.S. Pat. No. 4,348,801, issued Sept. 14, 1982. This patented bale dewiring tool has a foot which engages the wire by sliding under it before cutting. It allows a single operator to cut the wire and with the same tool to grab and to pull it, so as to remove the same for discharge into a scrap cart. A number of drawbacks appears when using this patented dewiring tool. The tool sometimes slides under the first layer of paper instead of over it. There are no means for sensing the location of the wire to be cut and, thus, this has to be done de visu. It is somewhat inefficient because each tool can retain only one wire at a time; since a bale is normally tightened by four wires, this means that each wire must be completely pulled out and discharged to scrap before another wire is tackled. Moreover, a separate coiler former device is required for disposal of the scrap wires. Finally, wear is a problem for the cam grabber since it must bite into the wire to retain the latter.

OBJECTS OF THE INVENTION

The general object of the present invention is to provide a bale dewiring tool which is an improvement over the patented previously-described tool, in that it can grab, cut and retain several baling wires at a time.

Another object of the invention is to provide a dewiring tool of the character described, provided with means for coiling the cut wires before discharging them to waste.

Another object of the present invention is to provide a tool of the character described, which is properly positioned on the wire selected for cutting by a simple lowering of the tool onto the bale instead of sliding the tool on the bale.

Another object of the invention is to provide a dewiring apparatus including the above dewiring tool mounted in a head controlled by an electro-mechanical system to displace the tool head along three axes, in order to cut all wires of a bale in a single pass.

Another object of the invention is to provide a dewiring apparatus which is automatically monitored by a pre-programmed computer.

SUMMARY OF THE INVENTION

The dewiring tool comprises a support casing, a tube rotatable within the casing and projecting downwardly therefrom, said tube defines a pair of opposite slits having a lower portion upwardly spiralling through a fraction of a turn from the bottom mouth of the tube, and an upper portion extending parallel to the tube longitudinal axis. A wire is engageable through the lower slit portions upon rotation of the tube resting against the bale. Rotation of the tube brings the wire upwardly into the bottom end of the upper slit portions. A grabber is mounted for up-and-down movement within the tube. It pulls the wire upwardly through the slit upper portions. During this upward wire movement, a wire-bend former and a cutter bends and cuts the wire respectively. The bent end of the cut wire is thus retained by the bend former within the tube slits above the level of the cutter, so that additional wires can be cut and retained. The tool tube can be rotated several turns to serve as a mandrel, which, in association with a coiling shoe, forms a coil out of the several wires. The shoe and the grabber then discharge the coil to scrap.

In accordance with a further feature of the invention, the tool is mounted at the end of a boom, which is arranged to rotate about a vertical axis and also to move in forward and rearward direction, so as to displace and apply the tool onto any selected area of the top surface of the bale positioned at a dewiring station.

BRIEF DESCRIPTION OF THE DRAWINGS

FIG. 3 is an enlarged partly-sectional view of the head taken along line 3—3 of FIG. 2, with the shoe shown in a first lowered sliding position;

FIGS. 6 and 7 are sectional views taken along lines 6—6 and 7—7 of FIGS. 4A and 6, respectively, but on a larger scale than FIG. 4;

FIGS. 7A to 7D are longitudinal sections of the lower part of the tube assembly of FIG. 7, sequentially showing how the grabber pulls the wire up for bending and cutting, then down for extraction;

FIGS. 7C and 7D also show a wire coil wound around the lower end of the tube;

FIGS. 14 and 14A sequentially show how rotation of the tube is controlled by prosimity switches.

DETAILED DESCRIPTION OF THE PREFERRED EMBODIMENT OF THE INVENTION

Figure 2:
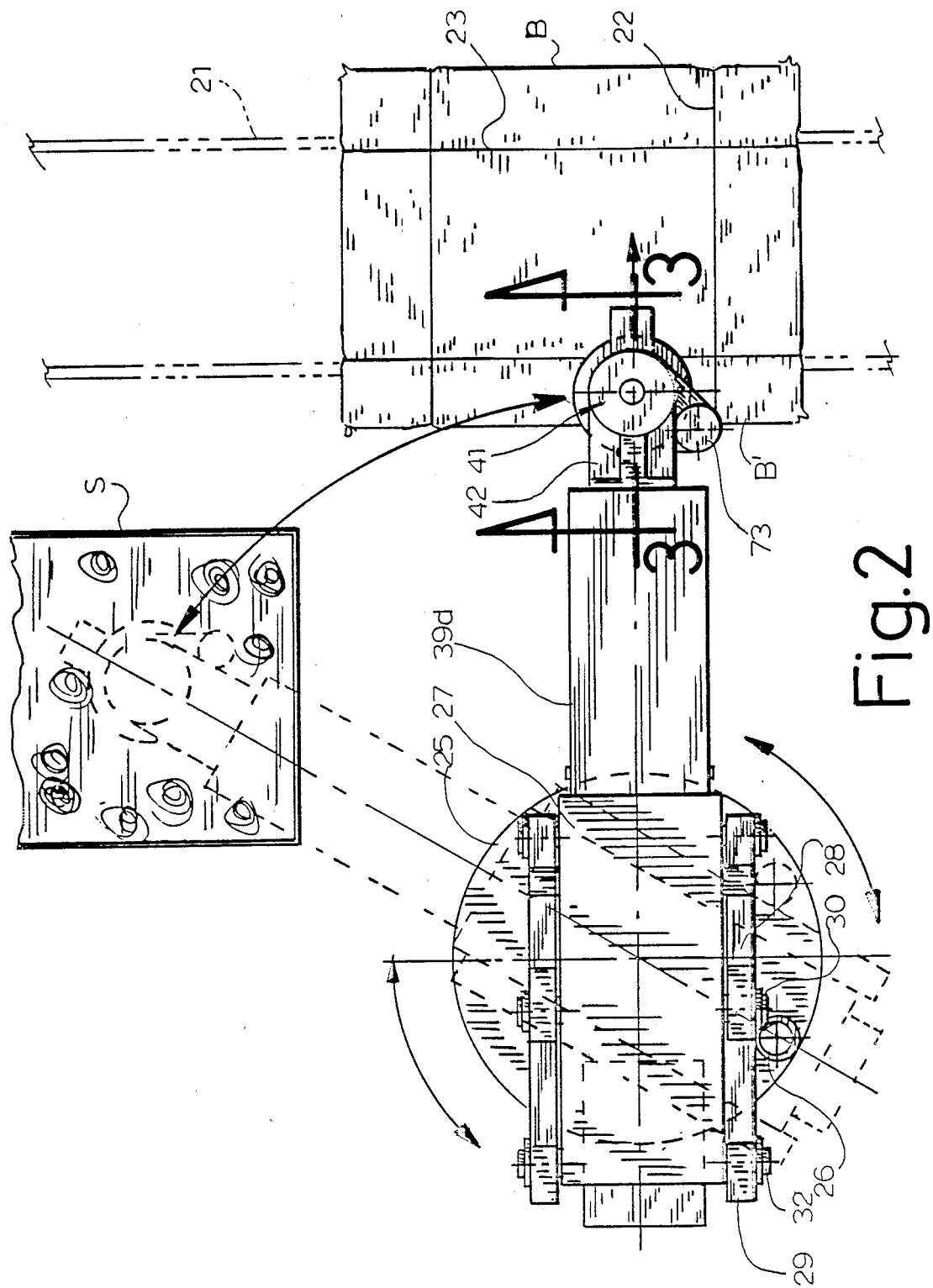
FIG. 2 is a top plan view of the apparatus, taken along line 2—2 of FIG. 1, and further showing a scrap cart in the process of being loaded with coils of cut wires.

The dewiring apparatus, generally indicated at 20, is mounted on a floor F laterally of a conveyor 21 for moving successive bales B to the dewiring station. Bales B are normally tied with wires 22 running transversely of the bales, and wires 23 running longitudinally of the bale. Apparatus 20 is designed to cut all the wires 22 and 23 in a single pass, then wind these wires into a coil and discharge the coil into a scrap bin S, as shown in FIG. 2.

Figure 1:
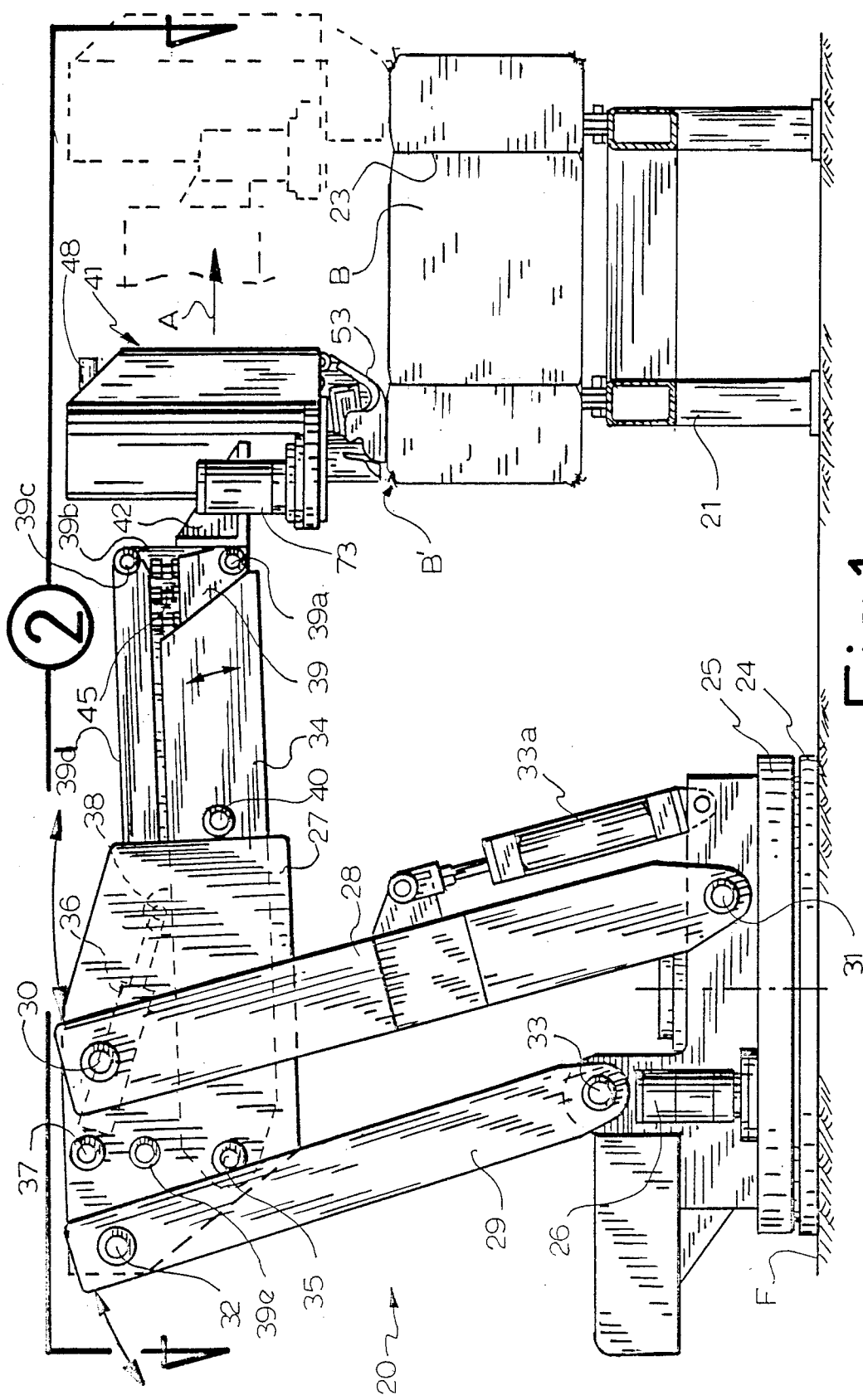
FIG. 1 is a side elevation of the dewiring apparatus in accordance with the invention shown in operation on a bale supported by a conveyor.

The dewiring apparatus 20, as shown in FIG. 1, comprises a base plate 24 fixed to the floor F, on which is supported a pedestal 25 rotatably driven about a vertical axis by suitable driving means, such as a reversible hydraulic motor 26. A boom support 27 is pivotally carried above pedestal 25 by two pairs of arms 28, 29. Front arms 28 are pivoted at their upper and lower ends by horizontal pivots 30, 31 to the boom support 27 and pedestal 25, respectively. Similarly, rear arms 29 are pivotally connected by upper pivot 32 to boom support 27 and by lower pivot 33 to pedestal 25. A double-acting hydraulic cylinder 33a, connected to the front arms 28 and to the pedestal 25, serves to move the boom support forwardly towards and across the bale at the dewiring station and in a reverse direction. Pedestal 25 can swing pivot the boom support about its vertical axis, as shown in FIG. 2.

A main boom 34 is pivoted within boom support 27 by means of horizontal pivot axis 35 and extends forwardly of the boom support. The main boom can pivot up and down under the action of a double-acting hydraulic cylinder 36 pivoted to the boom support at 37 and to the main boom at 38.

An inner boom 39 partially extends within main boom 34, is pivoted to the latter by pivot 40 at its inner end and carries a tool head 41 at its outer end through an angle bracket 42. A compression coil spring 43 extends between the bottom of main boom 34 and a rest plate 44, adjustably carried by the top of inner boom 39 through central bolt 45 and lock nut 46 and guided by lateral bolts 45a fixed by lock nuts 46a. Therefore, when the tool comes to rest on the top surface of bale B, while the main boom 34 continues to pivot downwardly, a bale contact switch 47, carried by main boom 34, is closed to stop the downward movement of the main boom 34. This switch is called a bale-contact pressure switch.

Hence, it is now understood that tool head 41 can be displaced along any one of its three axes via the rotation of base 25, the pivotal movement of arms 28 and 29, and the up-and-down movement of main boom 34.

Tool head 41 is provided at the top thereof, as shown in FIG. 1, with a diffused scan photo-electric switch 48, which is sensitive to white color. Therefore, it recognizes the location of the edge B' of a bale B. The signals from the photo-electric switch 48 and bale contact switch 47 sequentially set the transverse movement of the tool head 41 across the surface of the bale B.

The tool head 41 moves in the direction of arrow A across the bale to sequentially grab and cut the two bale wires 23.

The tool head proper is shown in FIG. 3; it includes a cylindrical casing 49 directly secured to the angle bracket 42 by bolts 50. A vertical arm 51 is secured to cylindrical casing 49 by bolts 52 and is disposed opposite angle bracket 42. The photo-electric switch 48 is mounted on top of the vertical arm 51, with its lens directed vertically downwardly to scan edge B' of bale B.

A sliding shoe 53 is pivoted at 54 to the lower end of arm 51. A pair of double-acting hydraulic cylinders 56, the cylinders of which are mounted back to back and secured together, have their piston rods 57 pivoted at 58 to the upper end of vertical arm 51, and at 59 to the front end of the sliding shoe 53, respectively.

Figure 3A:
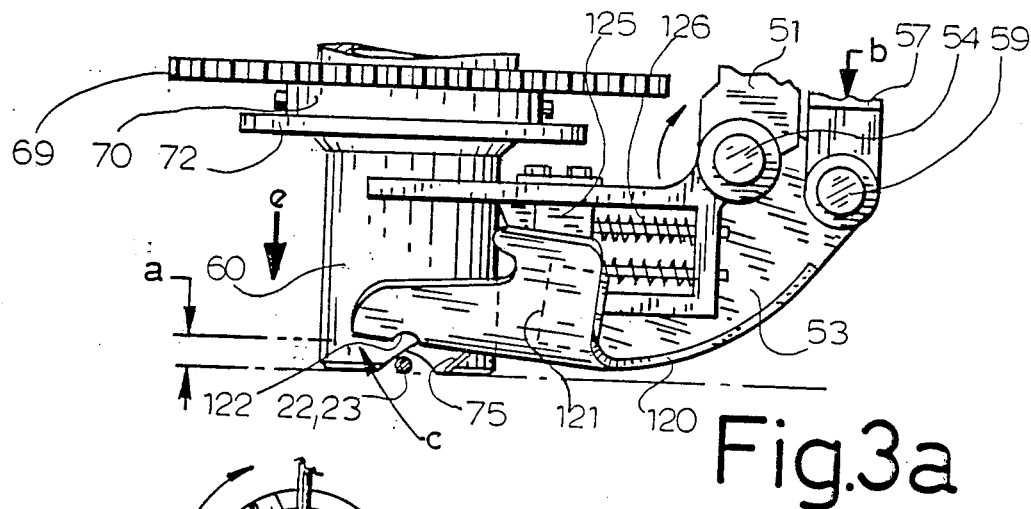
FIG. 3A is a view of the lower porition of FIG. 3, but with the shoe shown in a second raised position
Figure 5:
FIG. 5 is a sectional view taken along line 5—5 of FIG. 4.
Figure 12:
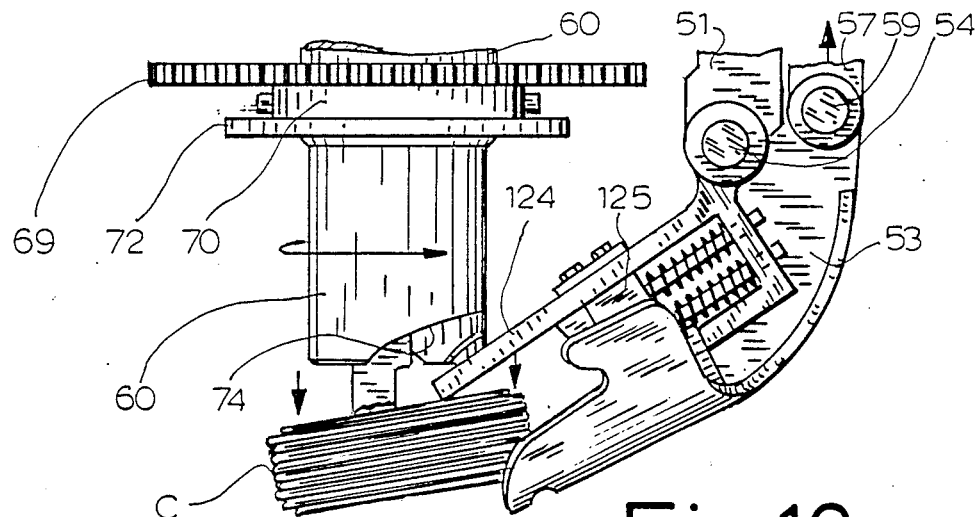
FIG. 12 is the view of FIG. 3 but with the sliding shoe shown in a third fully-lowered position, having extracted a wire coil.

When both piston rods 57 are fully retracted, the sliding shoe 53 takes a lowermost pivoted position, as shown in FIG. 12. When one of the piston rods 57 is extended, the sliding shoe 53 takes an intermediate position, as shown in FIG. 3, and when both piston rods 57 are fully extended, the sliding shoe 53 takes the elevated position shown in FIG. 3A. Sliding shoe 53 will be more specifically described hereinafter.

Referring to FIGS. 3 and 7, a tool tube 60 is provided, being of cylindrical shape and open at its ends and having at its external surface an upwardly-facing top shoulder 61; an intermediate downwardly-facing shoulder 62; and a lower downwardly-facing shoulder 63.

A top bearing 64 is slidably fitted around the upper part of tube 60 to abut top shoulder 61. A bearing 65, of larger external diameter, is slidably fitted on the tube 60 and abuts against the intermediate shoulder 62. The two bearings 64, 65 engage inner downwardly-facing shoulders formed in casing 49 and the larger bearing 65 retained by a cap 66 screwed onto the lower end of casing 49.

With this arrangement, the tube 60 cannot move axially with respect to casing 49, but can rotate freely. Two grease seals 67, 68 are provided between the upper end of the tool tube 60 and casing 49 on the one hand, and an intermediate portion of the tool tube and the cap 66 on the other hand.

Figure 13:
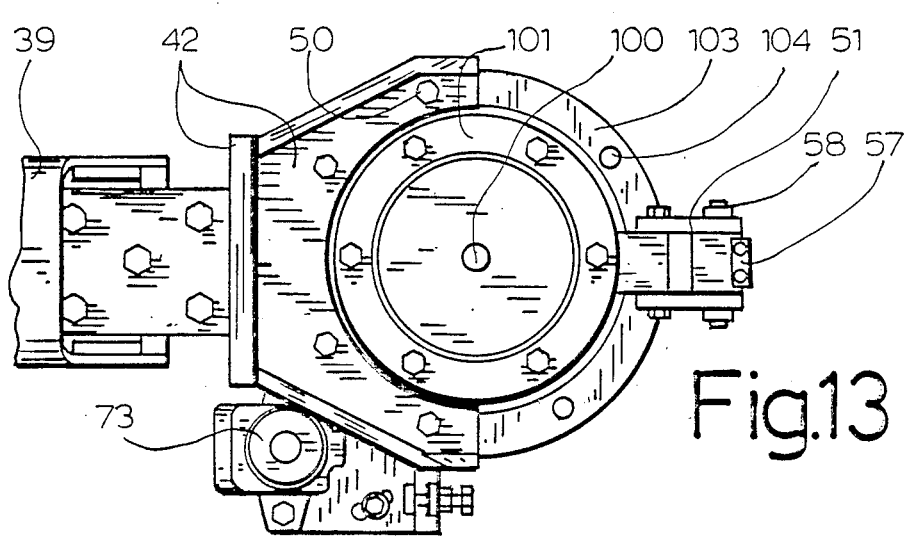
FIG. 13 is a top plan view of the tool head.

Referring to FIG. 3, a sprocket 69 surrounds tool tube 60 and aligns lower shoulder 63 and is fixed to tube 60 by a collar 70, fixed to the sprocket, and provided with setscrews 71 engaging the tube 60. Collar 70 is provided at its lower end with a deflector flange 72. A reversible hydraulic motor 73 (see FIGS. 1, 2, and 13) serves to rotate the tool tube 60 in either direction, the motor 73 driving the sprocket 69 through a transmission chain.

As shown in FIGS. 3A, 4, 4A, 5, 6, and 7 to 7D, the bottom end of the tube 60 is formed with a pair of diametrically-opposed slits 74, each having a lower portion 75, which freely opens at the bottom edge of the tool tube and which upwardly spirals through about 80 degrees. Each lower portion 75 is extended by an upper portion 76, which upwardly extends generally parallel to the tube longitudinal axis. Each slit 74 further has a notch 77 at the junction of the lower and upper portions 75, 76.

Figure 4:
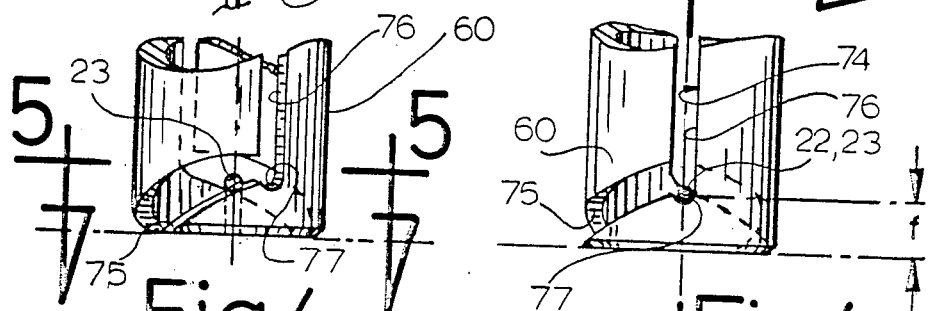
FIGS. 4 and 4A are partial side elevations of the rotatable tube in two different rotated positions.
Figure 4A:
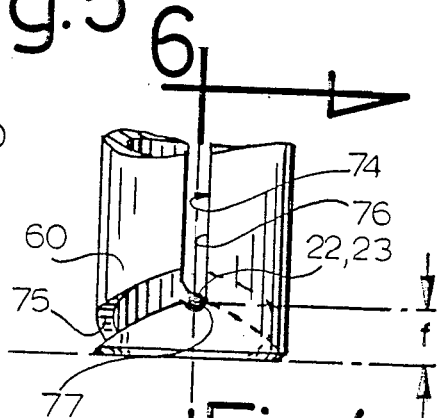
Figure 6:
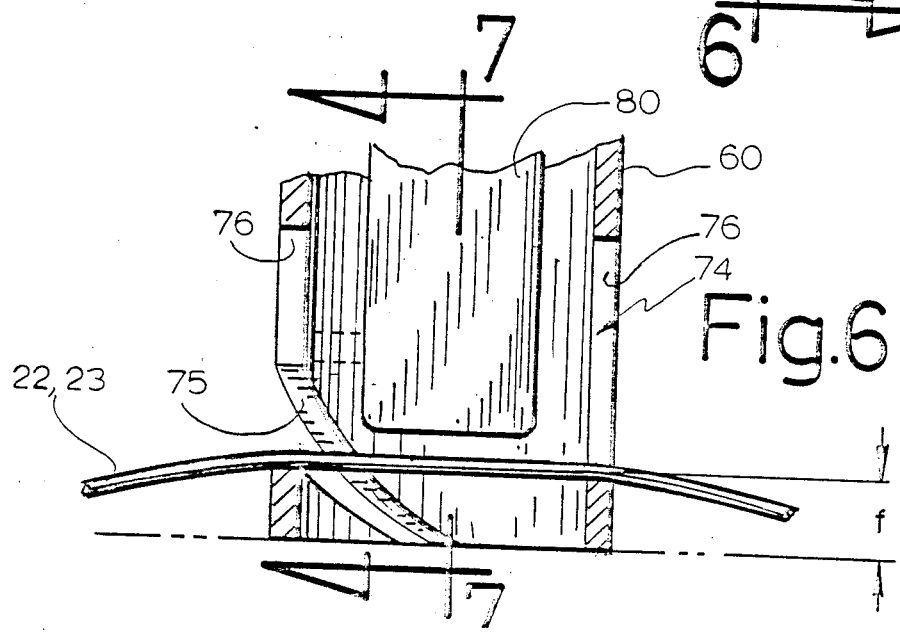

It will thus be understood that with the bottom end of the tool tube applied against the top surface of the bale in register with a baling wire 22 or 23, rotation of the tool tube will cause the wire to slide up the lower spiral edge of the slit until it engages the diametrically-opposite notches 77, as shown in the position indicated in FIG. 4A.

Figure 11:
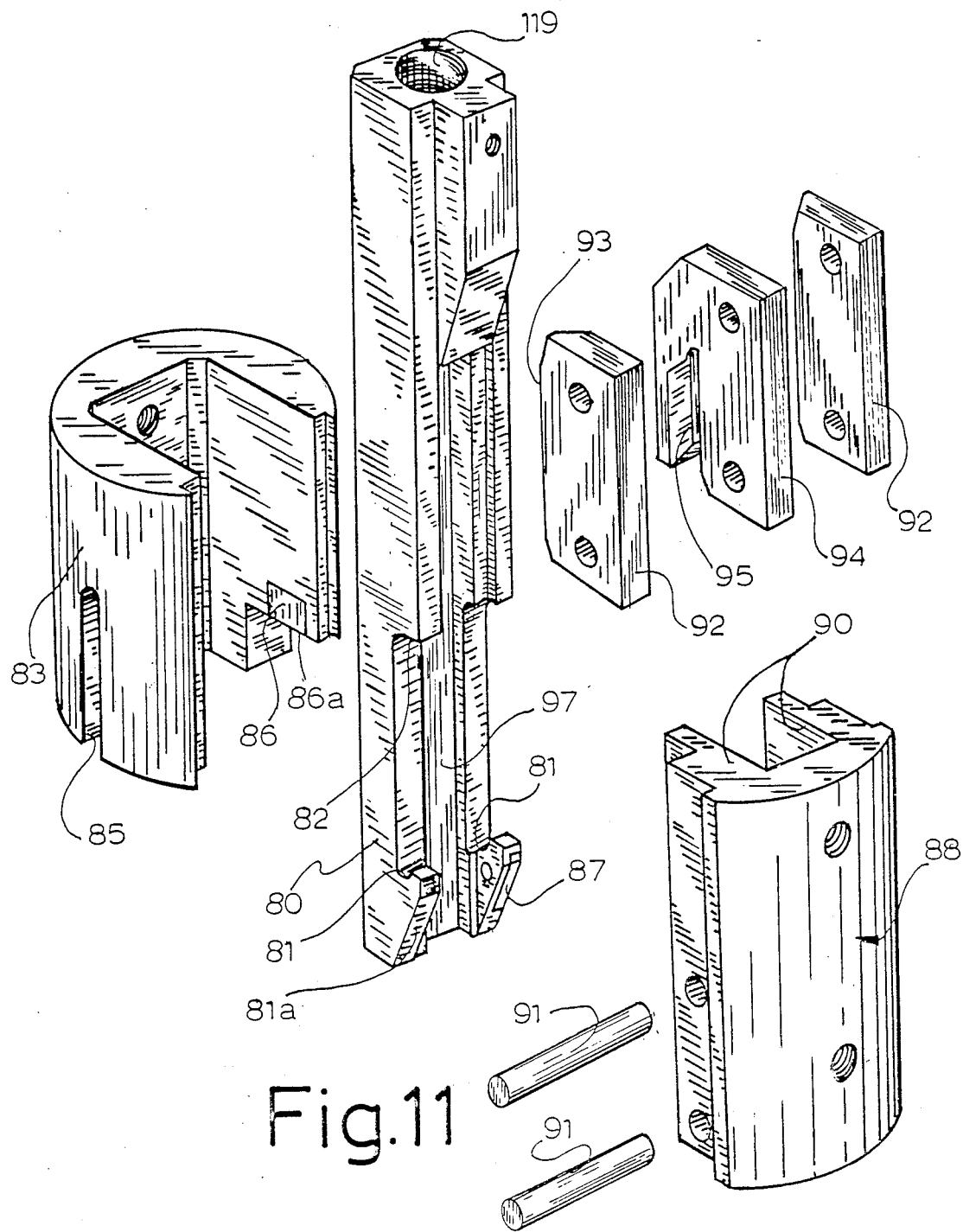
FIG. 11 is an exploded perspective view of the inner parts of the tool tube.

A grabber 80 is mounted within tool tube 60 for longitudinal reciprocating movement. Grabber 80 (see FIGS. 7 and 11) defines a pair of upwardly-opening wire-grabbing hooks 81 at its lower end and a pair of opposite downwardly-facing extracting shoulders 82 intermediate its ends. Grabber 80 is guided for up-and-down movement by a pair of rear and front guide blocks 83 and 88, respectively, (see FIGS. 9 and 11). Rear guide block 83 is of cross-sectionally U-shape, with the grabber 80 fitted within the U. The guide block 83 is secured in position within the tube 60 by screws 84. It is provided on one of its side legs with a longitudinal downwardly-extending slot 85 registering with one of the upper slit portions 76. The opposite leg of the U-shape guide block 83 has a cutting bit 86 releasably embedded therein and said bit having a lower, horizontal edge 86A disposed above notches 77 and in transverse alignment therewith. Grabber 80 is also provided with a cutting bit 87, having a cutting edge extending across that hook 81 which is adapted to slide along the cutting bit 87. Thus, during upward movement of the grabber 80, the two cutting bits 86, 87 effect a shear-like cutting action on the baling wire extending transversely of the tool tube through the two slit portions 76.

This cutting action is effected during an intermediate part of the upward stroke of the grabber 80 and the wire cut portion 22A (see FIG. 9) is simply discharged from the slit portion 76 on the side of cutting bits 86, 87. The front guide block 88 is fixed inside the tool tube 60 by means of setscrew 89 (see FIG. 7). Guide block 88 has two parallel flanges 90 defining a channel, in which is fitted and retained, by means of dowel pins 91, a wire-bending assembly consisting of three plates disposed flat one against the other, namely: two lateral anvil plates 92, of similar shape, each having a bevelled, longitudinal edge 93, and a central bender plate 94. Central plate 94 has an upwardly-extending slot 95, the side edge 96 of which, that is nearer the grabber 80, being approximately in transverse alignment with the longitudinal edges 93 of the two anvil plates 92, as clearly shown in FIG. 9.

Figure 9:
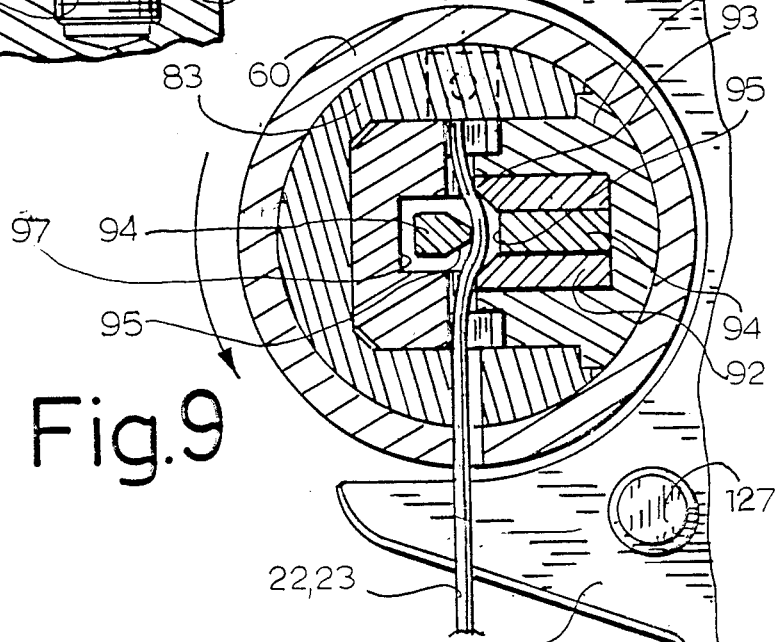
FIG. 9 is a cross-section taken along line 9—9 of FIG. 7A.

Edges 93 and 96 are arranged in transverse alignment with hooks 81 and with slit upper portions 76, as shown in FIG. 7. Grabber 80 has a central, longitudinal channel 97 to accommodate central plate 94. The lower edges of the assembly of the plates 92, 94 is just above the level of notches 77 and below the level of the cutting edge 86A of cutting bit 86. Therefore, as shown in FIG. 7, before the baling wire 22 or 23 is cut by cutting bits 86, 87 during lifting of said wire by the grabber hooks, the wire is caused to ride along the two longitudinal edges 93 of the anvil plates 92 and along the bending edge 96 of the central plate 94, whereby the wire is bent, as shown in FIG. 9. The bent wire end is retained by the bender assembly after the wire has been cut. The first wire is lifted along the bender until it engages the upper end of the slot 95, where it remains upon the next downward movement of the grabber 80. The slit upper portion 76 and the length of the slot 95 of the central plate 94 is sufficient to accommodate several cut and bent wires in superposed relationship, all held by the wire-bending assembly.

Figure 8:
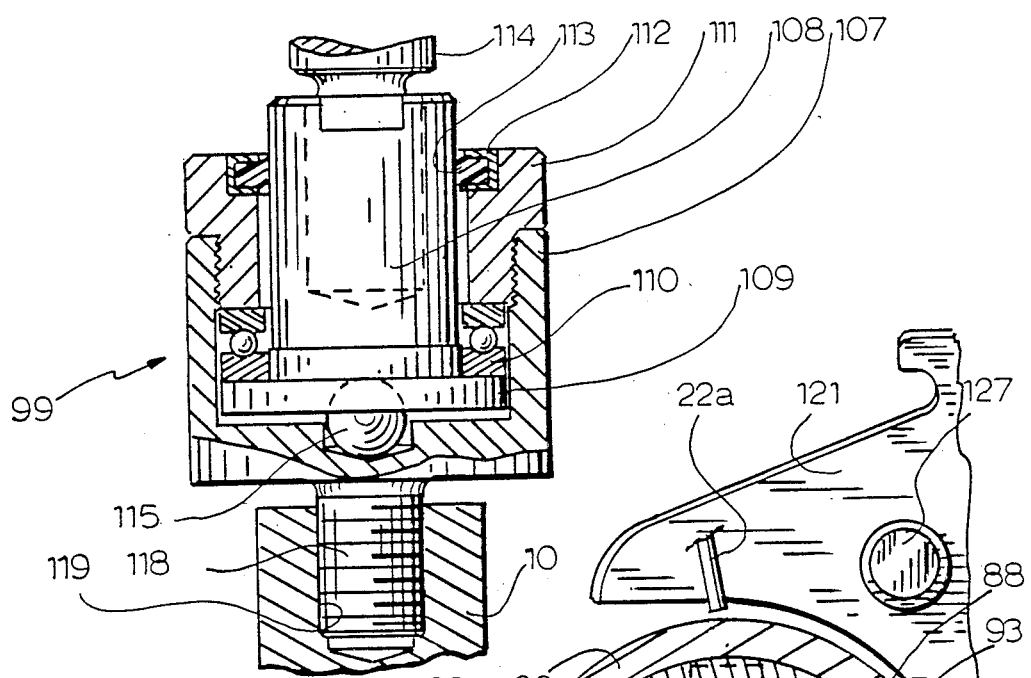
FIG. 8 is a longitudinal section detailing the rotary joint between the grabber and its actuating hydraulic ram, FIG. 8 being a section taken along line 8—8 of FIG. 7.

Grabber 80 is reciprocated by a pair of double-acting hydraulic cylinders 98, mounted back to back in an arrangement similar to cylinders 56 through the provision of a rotary joint 99 (see FIGS. 3 and 8). The piston rod 100 of the top cylinder 98 is screwed into a cover 101 of a cylindrical casing 102, which is supported by casing 49 on top thereof, being retained by a ring 103 and bolts 104.

The hydraulic lines 105 feeding the cylinders 98 are free to move in a slot 106, made in casing 102. The rotary joint 99 comprises a barrel 107, in which is fitted a stem 108 provided at its lower end with a flange 109 supporting a thrust bearing 110, which is retained at the top by an annular cap 111 screwed within the top end of barrel 107 and carrying a grease seal 112 sliding on stem 108. The stem 108 has an internally-threaded bore 113 in which is screwed the threaded end of the piston rod 114 of the lower cylinder 98. A thrust ball 115 is located between the lower end of stem 108 and the bottom closure wall 117 of barrel 107. An externally-threaded shaft 118 is fixed to, and depends from, the closure wall 117 and is screwed within the internally-threaded bore 119 made in the upper end of grabber 80 (see also FIG. 11). Rotary joint 99 allows rotation of the tool tube together with the grabber 80 and of the bender assembly, while permitting actuation of the grabber 80 under the action of the cylinders 98. During the down-movement, the thrust is exerted on the grabber by the thrust ball 115. During the up-movement of the grabber, the thrust is exerted through the thrust bearing 110.

Figure 7C:
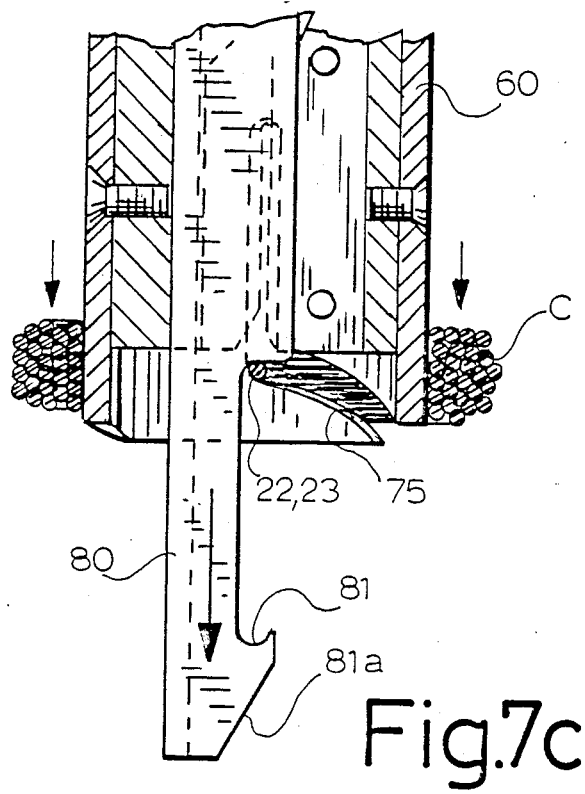

The pair of cylinders 98 impart three rest positions to the grabber, namely: a top position, as shown in FIG. 7B; an intermediate position, as shown in FIG. 7 wherein the grabber 80 protrudes by an amount indicated by letter g from the bottom end of the tool tube; and a lowermost wire-extracting position, as shown in FIG. 7C.

Figure 10:
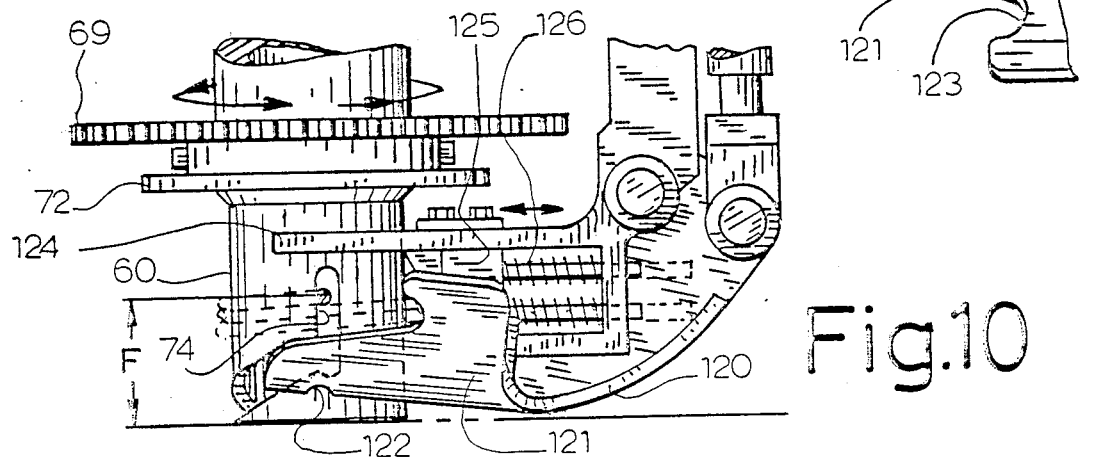
FIG. 10 is a view of FIG. 3A but showing the shoe raised for coiling the wires around the rotating tool tube.

The sliding shoe 53 (see FIGS. 9 and 10) forms a longitudinally-curved surface 120 and two transversely-curved wings 121 which partially surround the tool tube 60. Each wing 21 is provided at its end with a notch 122 facing downwardly, the two notches being transversely aligned with the center line of the tool tube. Each wing 121 is further provided with a notch 123 near its top end. The two notches 123 are also transversely aligned.

An extractor plate 124 is secured to the sliding shoe 53 and extends over the wings 121. This extractor plate has a U-shape when seen in top plan view, so as to partially surround the tool tube in a similar manner at the wings 121.

A coiling pad 125 is slidingly and guidingly suspended from the extractor plate 124, being disposed between the wings 121, and is radially outwardly movable with respect to the tool tube 60 against the bias of compression coil springs 126. Sliding shoe 53 further carries a pair of proximity sensors 127 to detect the presence of a baling wire 22 or 23.

Figure 14:
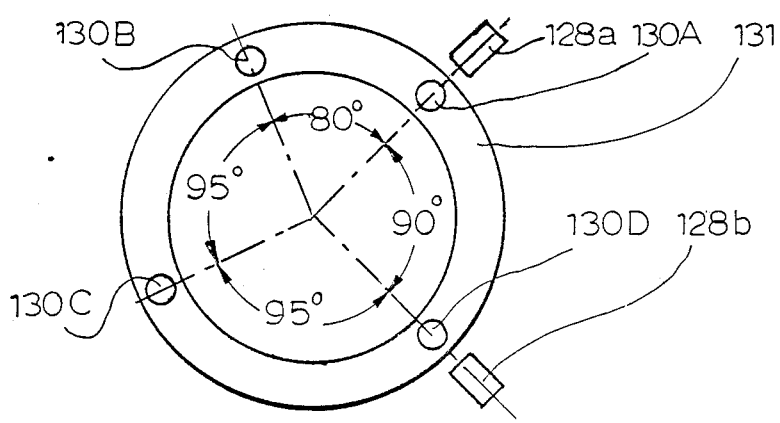

Referring to FIG. 3 and also to FIG. 14, two proximity sensors 128a, 128b are secured by brackets 129 at 90 degrees apart to the casing 49 and are downwardly directed to detect the presence of four holes 130a, 130b, 130c, 130d made in a ring 131 fixed to the sprocket 69 and co-axial therewith and with the tool tube 60.

The angles made between the holes are as follows:
80 degrees between holes 130A and 130B;
95 degrees between holes 130B and 130C;
95 degrees between holes 130C and 130D; and
90 degrees between holes 130D and 130A.

The sensors 128 operate switches to in turn control the rotation of the hydraulic motor 73 driving the tool tube for its angular positioning. The initial rotated position of the tool tube with respect to the sliding shoe is shown in FIG. 3a. Both sensors 128 are opposite the holes 130A and 130D, as shown in FIG. 14, these holes being 90 degrees apart. The simultaneous signal from both sensors therefore indicates the initial position of the tool tube. The sensor 128A is used only for this initial positioning. The wire-grabbing operation is done by rotating the tool tube in the clockwise direction. During this rotation, the baling wire is moved up along the spiralling lower slit portions 75 until engagement in notches 77. The stopping of the rotation is explained below.

Repositioning of the tool tube to its initial position is done by reversing its rotation until hole 130D is realigned with sensor 128B. The controler remembers if hole 130A or 130B has reached or passed sensor 128B. The above operations are done when the baling wire is transverse to the boom 34, that is when grabbing and cutting wires 23 (see FIG. 2).

The tool can be positioned so as to grab the transverse wires 22. In this case, the initial position is reached by rotating the hole 130A under sensor 128B. Repositioning is done similarly as above by reversing the same count of hole to find the initial position.

The apparatus of the invention operates as follows: once a bale B is in position opposite the apparatus, and it is desired to remove the bale wires 23, the boom 34 is first advanced until the sensor 48 detects the proximate edge of the bale B. The main boom 34 is lowered until the bale contact pressure switch 47 stops the downward movement of the main boom. The sliding shoe 53, which is in its sliding position, shown in FIG. 3, slightly below the bottom end of the tool tube 60, can slide along the bale top surface due to its longitudinal curved surface. The sliding shoe is advanced until the sensors 127 carried by the same, detect the presence of a baling wire 23. Advancing movement of the main boom is stopped exactly when the baling wire engages the notches 122, as shown in FIG. 3. In this position, the tool tube is exactly over the baling wire, the tool tube being in its initial position with the mouth of the spiral slits 75 engaged by the baling wire. The sliding shoe 53 is then retracted to its intermediate position, shown in FIG. 3A. Thus, the full weight of the tool head is allowed on the bale B. The tool tube is then rotated by the motor 73, which drives the sprocket 69. The tool tube is rotated through its grabbing cycle, whereby the wire is engaged by the spiral portions 75 of the slit 74, the wire still being under the sliding shoe. The wire engages the notches 77 at the junction of slit portions 75, 76. The rotation of the tool tube is stopped.

It is to be noted that the hydraulic motor 73 is equipped with a pressure-reducing valve to make it slip under load when the tool tube is grabbing a wire. A positive grab signal is given by an electronic timer that measures the time it takes for the sensor 128B to see the second next hole from its initial position. A time period, shorter than a preset value, will indicate a misgrab and make the grabbing cycle to repeat itself. A slip period, longer than the preset value, indicates a rotation of less than 170 degrees and, thus, a positive grab.

Upon a positive grab, grabber 80 is moved down from its upper position, shown in FIG. 7B, to its intermediate position, shown in FIG. 7. Thus, the bevelled hook edge 81A moves past the baling wire, so that the hook 81 is now underneath the wire. The lower end of the grabber 80 bears on the top face of the bale, so as to raise the tool tube 60, so as to further tighten the baling wire and cause the same to positively engage the notches 7. The wire is also forced to spring back into the grabber hooks 81. The grabber 80 moves the wire through the upper slit portion 76 where the wire is first passed through the bending assembly to bend the same and then cut by the co-acting cutting bits 86, 87. The retained end of the wire is pushed up the slot 95 of the wire-bending assembly and the wire is retained in the tool tube. The tool tube is then rotated to its original position; the sliding shoe is lowered into the position of FIG. 4; and the boom 34 continues its forward movement until the sensors 127, carried by the sliding shoe, detect the next baling wire. The grabbing bending and cutting cycle is repeated. Then, the tool head is swung about the vertical axis of the apparatus to grab and cut the transverse wires 22. During this transverse rotational movement, the sliding shoe easily slides on the bale top surface, due to its transversely-curved wings 121. The initial position of the rotating tube is also changed, using the sensors 128 and holes 30, as previously described, so as to align the tube with respect to the wire to be grabbed and cut.

The bent and cut end portion of each successsive wire is retained within the slits of the tool tube in superposed position.

It should be noted that after a baling wire has been cut, the tool tube has already been rotated through 80 degrees or more and, therefore, the baling wire issues from the tool tube, in a direction generally parallel to the longitudinal axis of the sliding shoe and, therefore, its projecting end is free to be raised above the wings of the sliding shoe during lifting of the wire to its final retained position within the tool tube.

After all the baling wires have been cut and retained by the tool head, the tool head is swung to the dotted line position, shown in FIG. 2, thereby pulling all the wires from underneath the blade and then the coiling cycle of all the baling wires is effected by continuous rotation of the tool tube, with the wires being applied against the external surface of the tool tube by the pressure pad 125, spring biased by the springs 126 to allow for increase in the diameter of the coil. The resulting coil C is retained between the extractor plate 124 and the wings 121 of the shoe.

Figure 7D:
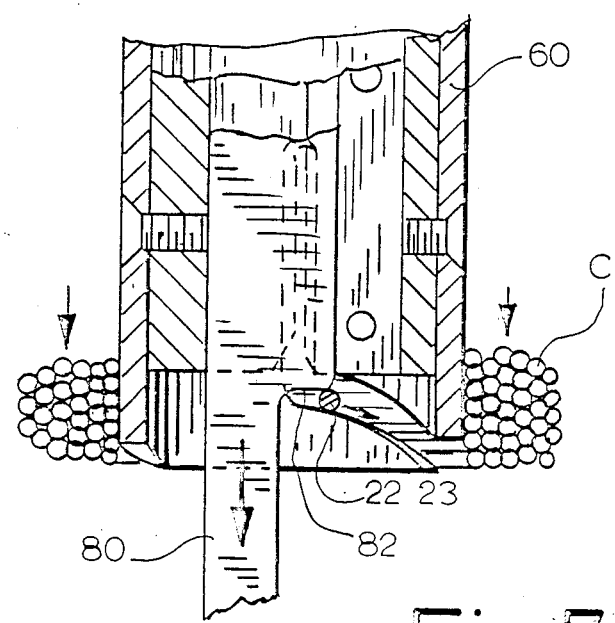

Once the coiling operation is completed, the grabber arm 80 moves downwardly, so that its extracting shoulders 82 push all the retained wires into the spiral slits 75 (FIGS. 7C, 7D and also the tool tube is rotated counterclockwise. The sliding shoe is moved downwardly, as shown in FIG. 12, whereby the extractor plate 124 positively extracts the coil C from the tool tube to discharge the coil C into the bin S.

The term "bale wire" used in the description and in the following claims includes metallic strapping or other similar types of binding which can be bent and remain bent.

I claim:

1. A tool for cutting and removing bale strapping wires comprising: a casing, an open-ended tube rotatably mounted in said casing, first power means carried by said casing to rotate said tube in either direction; said tube having an outer end portion protruding from said casing and terminated by a free end edge, said outer end portion having a pair of diametrically-opposed slits, each formed of an outer portion with a slit opening at said end edge and inwardly spiralling through a fraction of a turn and of an inner portion having a junction with said outer portion and extending generally parallel to the tube longitudinal axis; said tube free edge adapted to be pressed against a bale surface with an overlying wire engaging the slit openings; rotation of said tube by said first power means in one direction causing said wire to engage said outer spiral slits and to become spaced from said bale surface until said wire reaches the junction of said inner and outer slit portions to take a first position; a grabber arm mounted in said tube for reciprocating movement longitudinally of said tube, second power means to reciprocate said grabber arm, the latter having a hook at its outer portion facing inwardly for hooking said wire in said first position, and cutting means in said tube for engaging and cutting said wire upon the latter being moved inwardly through said inner slit portions by inward movement of said grabber arm.

2. A tool as defined in claim 1, further including a wire bender fixedly mounted in said tube and engaged by said wire upon further inward movement of said grabber arm, said wire bender thus bending and retaining the cut end of said wire.

3. A tool as defined in claim 2, wherein said grabber arm has an outwardly-facing wire extracting shoulder engaging the cut and bent wire and extracting the latter from said bender upon outward movement of said grabber arm.

4. A tool as defined in claim 3, further including a coiling member carried by said casing opposite the outer end portion of said tube and having a pad engaging the portion of the cut and retained wire outwardly extending from said tube through a slit inner portion to press and coil said wire around said tube outer portion upon rotation of said tube.

5. A tool as defined in claim 4, wherein said coiling member is movably carried by said casing for movement longitudinally of said tube; third power means carried by said casing to move said coiling member; an extractor member carried by said coiling member and partly surrounding said tube outer portion and extracting the coiled wire from said tube outer portion upon movement of said coiling member outwardly of said tube.

6. A tool as defined in claim 5, wherein said pad is spring-biased to allow increase of the diameter of the coil formed by the wire as the latter is being coiled.

7. A tool as defined in claim 6, wherein said coiling member includes a shoe having a U-shape partly surrounding the outer end portion of said tube, said shoe movable with said coiling member between a first and a second position, spaced outwardly of and inwardly from said tube free end edge, respectively, said shoe having a curved outer surface to engage and slide on said bale surface in its first position.

8. A tool as claimed in claim 7, wherein said third power means include a pair of double-acting hydraulic cylinder and piston units, with the cylinders mounted back to back, the piston rod of one cylinder pivotally attached to said casing, the piston rod of the other cylinder being pivotally attached to said coiling member, the latter being pivotally connected to said casing for pivotal movement about an axis transverse to the longitudinal axis of said tube.

9. A tool as defined in claim 3, wherein said grabber arm is an elongated member, of non-rounded cross-section, and further including guiding blocks secured within said tube and providing a channel in which said grabber arm longitudinally and slidably fits, but cannot rotate, said second power means to reciprocate said grabber arm comprising a pair of double-acting cylinder and piston hydraulic units mounted over said casing, with the cylinders mounted back to back, the piston rod of one of said cylinders being fixed relative to said casing, the piston rod of the other one of said cylinders being attached to said grabber arm through a rotary joint, said pair of cylinders operable to position said grabber arm in three positions; namely, an outward position in which the extracting shoulder of said grabber arm is substantially at the level of said junction of said inner and outer slit portions, an inward intermediate position in which said hook engages a wire held at said junction, and a third more inward position in which said hook is at the inner end of said inner slit portion.

10. A tool as claimed in claim 9, wherein said wire bender comprises a pair of three plates fixedly mounted in one of said guide blocks in stacked position transversely of said tube, the outer ones of said plates providing longitudinal anvil edges extending longitudinally of said tube, the central one of said plates having an outwardly-opening longitudinal slot with an edge facing said anvil edges, extending also longitudinally of said tube, said anvil edges and said central edge forming a three-point contact with a wire engaging between said edges while said wire is moved inwardly by said hook.

11. A tool as defined in claim 10, wherein said grabber arm has a longitudinal channel facing said assembly of three plates and receiving the central one of said plates, with said hook formed of two transversely-spaced hook members in transverse alignment with said anvil edges.

12. A tool as claimed in claim 11, wherein said cutting means includes a first cutting bit carried by one of said hook members, and a second cutting bit carried by one of said guiding blocks, said two cutting bits being in slidable contact with each other and effecting a shear-like cutting action on a wire held by said hook members upon an inward movement of said grabber arm, said second bit member being located longitudinally inwardly from the outermost ends of said anvil edges, whereby said wire is first bent and then cut upon inward movement of said grabber arm.

13. A tool as defined in claim 12, further including a shoe partly surrounding said outer end portion of said tube and pivotally connected to said casing and positionable to a first and a second position, spaced outwardly of and inwardly of said tube free end edge, respectively, an articulated carrier mounted on a support surface and including a boom carrying said tool casing at an outer end thereof; fourth power means acting on said boom to move said tool casing up and down and horizontally; first sensor means carried by said casing to detect the presence of a bale upon movement of said tool casing towards said bale; said shoe further including second sensor means to detect the presence of a wire upon sliding movement of said shoe over said bale in the first position of said shoe to stop movement of said carrier when said tube free end edge is in register with said wire; and to retract said shoe to its second positoin.

14. A tool as claimed in claim 13, wherein said first power means to rotate said tube includes a sprocket fixed to said tube and surrounding the same, and a reversible hydraulic motor drivingly connected to said sprocket; further including means to control the rotation of said tube and third sensor means for

* * * * *